United States Patent [19]

Siracusa et al.

[11] Patent Number: 5,289,276
[45] Date of Patent: Feb. 22, 1994

[54] METHOD AND APPARATUS FOR CONVEYING COMPRESSED VIDEO DATA OVER A NOISY COMMUNICATION CHANNEL

[75] Inventors: Robert J. Siracusa, Lawrenceville; Joel W. Zdepski, Lebanon, both of N.J.

[73] Assignee: General Electric Company, Princeton, N.J.

[21] Appl. No.: 901,045

[22] Filed: Jun. 19, 1992

[51] Int. Cl.[5] .................. H04N 7/04; H04N 7/12
[52] U.S. Cl. ...................... 348/467; 375/58; 371/69.1; 348/473; 348/384; 348/426
[58] Field of Search .......... 358/141, 167, 133, 135, 358/136, 12, 13; 375/58; 371/69.1; 370/99, 110.1; H04N 7/04, 7/12, 7/00

[56] References Cited

U.S. PATENT DOCUMENTS

| | | | |
|---|---|---|---|
| 3,760,371 | 9/1973 | Pitroda et al. | 371/69.1 |
| 4,286,334 | 8/1981 | Gammel et al. | 371/69.1 |
| 4,785,349 | 11/1988 | Keith et al. | 358/136 |
| 4,827,339 | 5/1989 | Wada et al. | 358/136 |
| 4,908,828 | 3/1990 | Tikalsky | 371/69.1 |
| 5,111,292 | 5/1992 | Kuriacose et al. | 358/133 |
| 5,138,440 | 8/1992 | Radice | 358/13 |
| 5,144,424 | 9/1992 | Sauatier | 358/133 |
| 5,144,425 | 9/1992 | Kuriacose | 358/133 |
| 5,148,272 | 9/1992 | Acampora et al. | 358/133 |
| 5,159,452 | 10/1992 | Kinoshita et al. | 358/141 |
| 5,164,963 | 11/1992 | Lawrence et al. | 375/58 |
| 5,168,356 | 12/1992 | Acampora et al. | 358/136 |
| 5,189,671 | 2/1991 | Cheng | 370/99 |

OTHER PUBLICATIONS

ISO-IEC JT (1/SC2/WGI), "Coding of Moving Pictures and Associated Audio" MPEG 90/176 Rev. 2, Dec. 18, 1990.
U.S. Ser. No. 814,207, filed Dec. 20, 1991 A. A. Acampora, et al. "Apparatus for Segmenting Coded Video Signal for Transmission".

*Primary Examiner*—Mark R. Powell
*Assistant Examiner*—Safet Metjahic
*Attorney, Agent, or Firm*—Joseph S. Tripoli; Eric P. Herrmann; Ronald H. Kurdyla

[57] ABSTRACT

A digital compressed video signal transmission system includes a transport processor for segmenting compressed data into transport cells for transmission. Particular portions of the compressed data are formatted into further transport cells, which further transport cells are interspersed with normally occurring transport cells. The further transport cells include redundant video signal data which may be utilized to resynchronize a compressed video signal decoder after loss or corruption of transmitted data.

15 Claims, 10 Drawing Sheets

FIG. 1
LINK LAYER

VIDEO TRANSPORT LEVEL
2 TIER ENTRY-POINT HEADER FORMAT

| ENTRY-POINT DATA (32 BITS) | | | | |
|---|---|---|---|---|
| ENTRY POINTER | FRAME TYPE | FRAME NUMBER | UNASSIGNED | SLICE/MBLK ID |
| 7 BITS | 2 BITS | 5 BITS | 5 BITS | 13 BITS |

METHOD AND APPARATUS FOR CONVEYING COMPRESSED VIDEO DATA OVER A NOISY COMMUNICATION CHANNEL

The present invention relates to a method and apparatus for segmenting compressed video data into cells or packets for transmission in a manner to allow a receiver to rapidly recover from occurrences of missing data or corrupted data.

BACKGROUND OF THE INVENTION

The Moving Picture Experts Group (MPEG) are establshing a standard for transmission and storage of video data primarily for use by computers. This proposed standard is detailed in the document "International Organization for Standardization", ISO-IEC JT(1/SC2/WG1), Coding of Moving Pictures and Associated Audio, MPEG 90/176 Rev. 2, Dec. 18, 1990. The signal protocol is hierarchical or layered. Frames of video data are compressed in groups of, for example, 15 frames. Respective frames are either intraframe encoded (I frames), forward predictive interframe encoded (P frames) or forward/backward predictive interframe encoded (B frames). Each frame is divided into slices corresponding to horizontal image bands (e.g., 16 line stripes). The slices are segmented into macroblocks consisting of matrices of 16 by 16 pixels. The macroblocks are encoded in four 8 by 8 blocks of luminance values, and two 8 by 8 blocks of chrominance values (U and V signal components). Each of the 8 by 8 chrominance blocks are derived by horizontally and vertically subsampling component chrominance values representing respective 16 by 16 macroblocks. The signal protocol calls for a sequence layer for identifying the overall signal type, which layer includes a sequence start code and header information identifying, for example, picture size, pixel aspect ratio, picture rate, bit rate, buffer size, a number of flag bits, etc. Following the sequence layer is a group of pictures, GOP header which include a start code, a time code, a closed GOP flag, a broken link flag and extension data. The next layer includes a picture start code and picture header. The picture (PICT) header includes a temporal reference, picture coding type (I, P, B), buffer fullness, vector and pixel precision flags, variable length code identifiers and extension data. A slice start code follows the picture layer and includes a start code and a header identifying the slice. Following the slice layer is the macroblock layer which includes a start code and header data. The macroblock header data includes identifying indicia, quantizing information, type of encoding etc. The macroblock layer also includes motion vectors which are common to the six blocks of data in each macroblock, and encoded block data on a block by block basis. The compression algorithm involves predicting frames of video signal from prior frames of video signal and transmitting in compressed form, the differences between actual and predicted frames. Successively encoded frames are dependent on the correctness of prior encoded frames. Only one or a small number of frames in a group of pictures is non predictively encoded. It should be immediately recognized that, in a receiver, decoding errors due to data loss or corruption during transmission will propagate through successive frames within a GOP. In order to preclude the propagation of such errors and concomitant image corruption special precautions must be taken. However such precautions are not included in the MPEG protocol because it was fashioned primarily for noiseless transmission channels.

ADTV is a fully digital simulcast system that delivers high definition television (HDTV) in a single 6-MHz broadcast channel. It is currently being developed by the Advanced Television Research Consortium (ATRC). One of the primary design goals of ADTV is to deliver high-quality and robust digital HDTV service for terrestrial simulcast transmission. The ADTV system uses MPEG compression to permit transmission of HDTV signals within a 6-Mhz channel. However the ATRC has augmented MPEG by adding a custom higher layer structure (MPEG++Rev 1) to achieve sufficient signal robustness for transmission over noisy terrestrial transmission media. This augmentation includes the prioritization of MPEG data into a two tier high-priority (HP), low priority (LP) transmission scheme, and includes a transport protocol to support multiple data services, and to provide graceful degradation in receiver performance in the presence of transmission errors.

DirecTV is a fully digital system that delivers standard definition NTSC television to the home over a satellite channel. It is currently being developed by Thomson Consumer Electronics (TCE). It is similar to ADTV in that it uses MPEG data compression but it is not HDTV. This is a one tier system, for transmitting NTSC quality television signals.

SUMMARY OF THE INVENTION

The present invention involves a transport protocol for arranging hierarchically formatted compressed video data for robust transmission in noisy communication channels and apparatus for realizing the transport protocol. The transport protocol presented here defines cells (or packets) of data where each cell includes a Prefix and a Transport Block. In an exemplary embodiment, the Prefix consists of four bits of control information and twelve bits for service channel identification. The Transport Blocks, (typically 128 bytes) consists of either Auxiliary data, Redundant MPEG Headers, or standard MPEG data. Compressed video data is applied to a transport processor which is responsive to the header data to develop transport block headers, and to store particular header data. The transport processor segments the compressed data into data blocks of predetermined size and appends transport headers thereto to form cells for transmission. The particular stored header data is formatted into a plurality of cells and these cells are interspersed between regularly occurring successive cells of compressed data.

DETAILED DESCRIPTION

The transport protocol of the present invention includes three data protocol layers; a link layer; a transport layer; and a service layer. The link layer is arranged to be service indepedent, while the service layers are service specific. A "service" refers to the type of data being transmitted in a particular transport cell, e.g., audio data, video data, auxiliary data etc.

Figure 1:
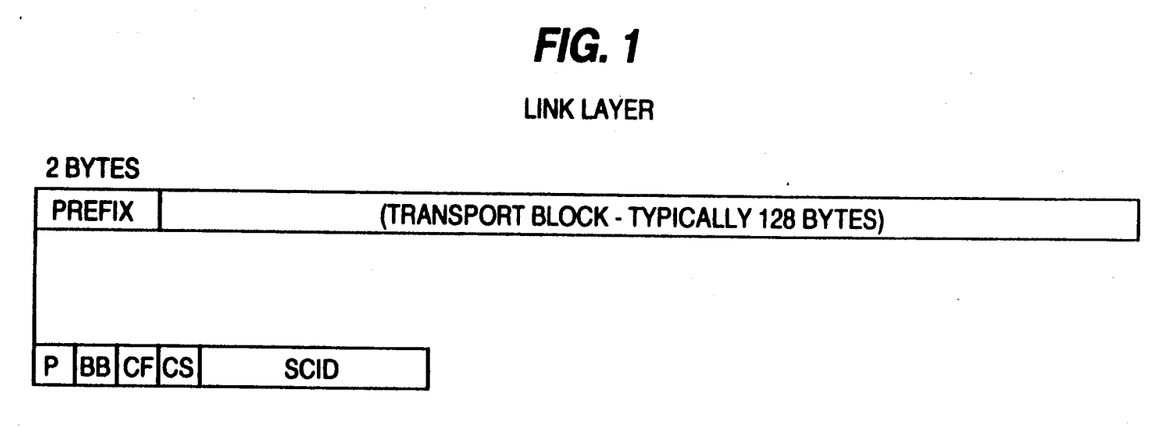
FIG. 1 is a schematic representation of a transport cell (or packet) of the transport layer utilized in the invention.

The link layer comprises a Prefix byte (actually two eight bit bytes) which contain several link layer control flags as well as channel identifiers for many different video, audio and data services. FIG. 1 shows the logical structure of a transport cell indicating the relationship between the Prefix and the Transport Block. The designators P, BB, CF, and CS are all one bit designators. The designator, P, is used in a two tier system to identify whether the transport block includes high or low priority data (1=HP, 0=LP), and is used in a one tier system for cell framing by toggling in successive cells. The designator, BB defines a bundle boundary and is set to a "1" value only for the first cell of respective bundles. The designator, CF, is a control flag used to indicate a scrambling state. CS is a control sync bit which toggles with each scramble key change.

The designation SCID is a twelve bit word which is used to identify service types. A SCID value of zero is reserved for null packets, and the value 4095 is reserved for future definition. The remaining 4094 SCID values are available for defining various service types.

Figure 2:
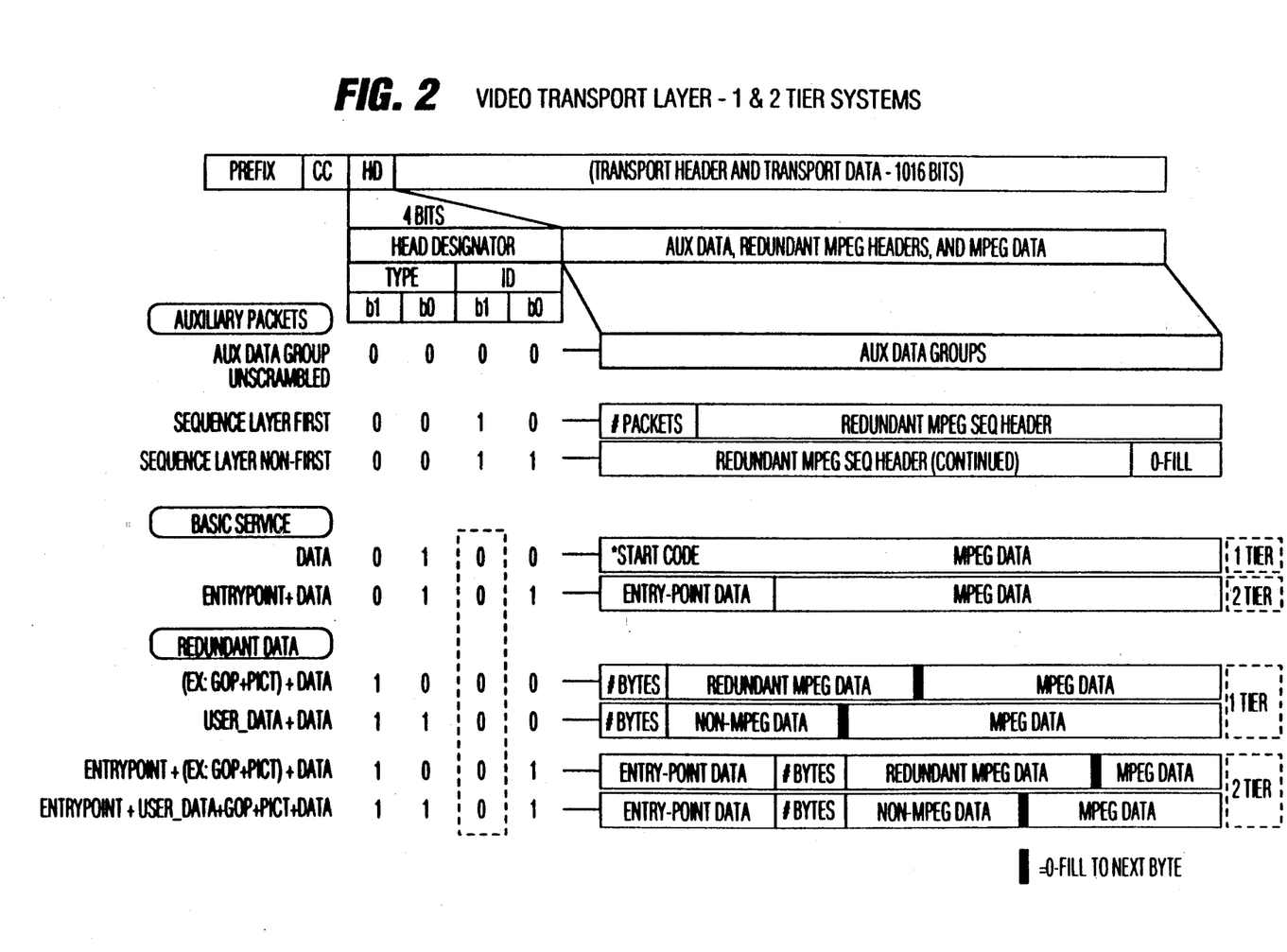
FIG. 2 is a schematic representation of a Transport Block for a video service included in a transport cell.

FIG. 2 illustrates the Video Transport Layer which is an example of one of many possible Transport Layer formats. Every service type can have a specific Transport Block format. This description pertains to MPEG encoded Video Transport services. FIG. 2 shows the logical structure of a transport block. The first field of the video transport layer contains a 4-bit continuity counter (CC). This counter increments by one for each cell transmitted. It is service dependent and priority dependent, i.e., separate counters are maintained for each service identity and for each transmission priority tier. The value of the continuity count sequences from 0 through 15. The continuity count provides a measure of error detection at respective receivers. A discontinuity in the received count indicates either errors in received data or a loss of continuous data for a particular transport service.

The next field in the video transport layer contains a 4-bit Header Designator (HD) which has two-bit subfields of Type and Identity. The subfields identify the form of data transmitted in the respective data field. For the Video Transport Layer, HD types 0, 1, 2 and 3 are used to respectively identify Auxiliary Packets, Basic Service Packets, Basic Service Packets with MPEG redundant data, and Basic Service Packets with NON_MPEG redundant data. The latter two types are non standard forms of transmitting MPEG data, and are included for completeness. The type "Basic Service Packets" is the only type identified which includes MPEG data in standard form albeit segmented in transport cells The type "Auxiliary Packets" in general is not an MPEG signal though in this application it is used to transmit redundant MPEG header data. Nominally the Auxiliary Packets are used to transmit auxiliary data such as closed captioning data, for example.

Figure 3:
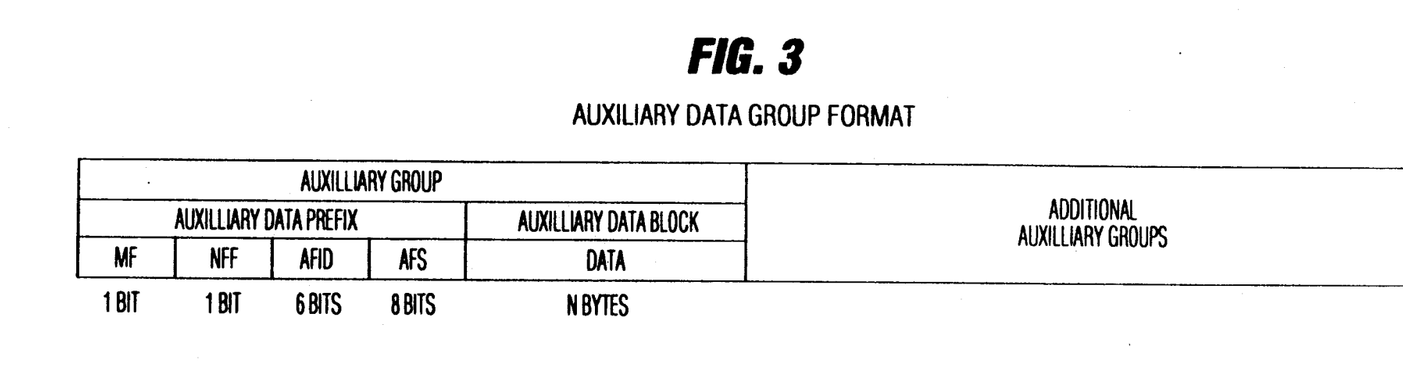
FIG. 3 is a schematic representation of an example of a format of Auxiliary Data cells.

The HD identity values define subsets of the HD types. One HD type/identity value combination (0/0) indicates an Auxiliary Data Group cell, and its contents are defined in FIG. 3. The fields of auxiliary data cells are to be unscrambled, therefore PREFIX bit CF is set to one. Each Data Group is self defined, with a flag-bit indicating whether additional Data Groups exist in the same packet. Data Groups contain such information as Time Code References, and Scramble Keys.

Figure 4:
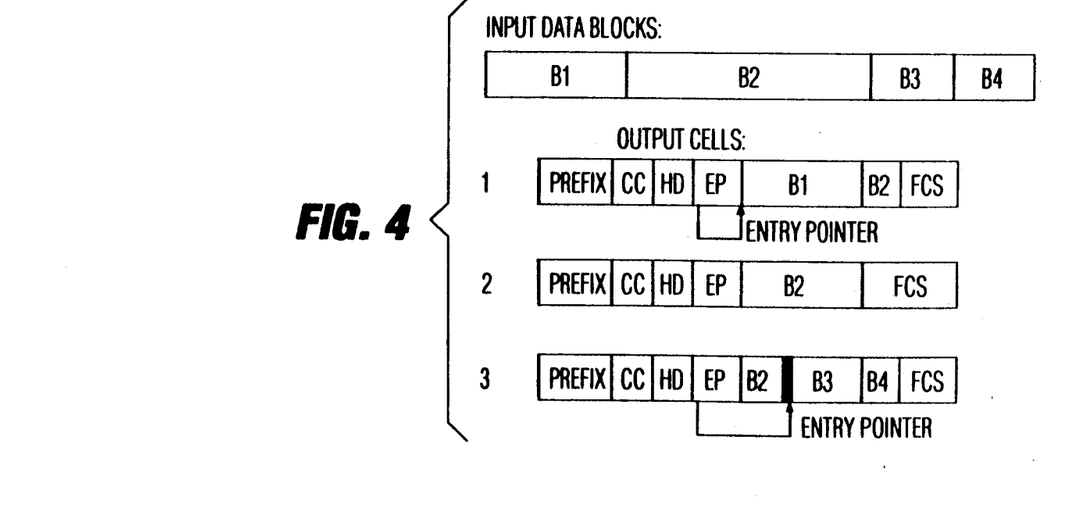
FIG. 4 is a schematic representation illustrating an entry-point concept utilized for fast re-entry into the compressed data stream.
Figure 5:
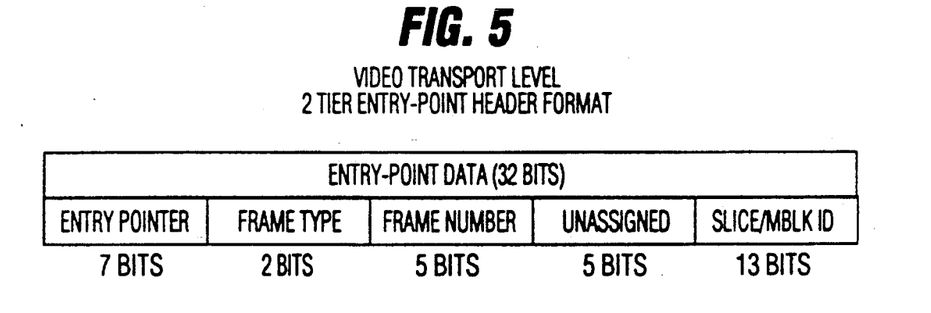
FIG. 5 is a schematic representation of the entry-point data in two-tier transmission systems.

Basic Service packets are used to carry most of the MPEG encoded data. Two-tier basic service packets include entry-point data to synchronize the two data streams. Entry-points allow data blocks to segment across cell boundaries. This concept is illustrated in FIG. 4. FIG. 5 shows the entry-point components found in the entry-point data field for two-tier transmission schemes. The frame type, slice, and macroblock identities are supplied by the video processor, while the entry pointer and frame number are supplied by the transport processor. The entry pointer is the byte offset to the entry-point position in the transport block. Frame type indicates whether the data referes to an intraframe encoded frame or an interframe encoded frame, or the first cell of a GOP. The frame number is used as a frame continuity counter, incrementing once per frame. Both the frame type and the frame number assist decoder synchronization of the two-tier data streams. The slice and macroblock identities are unique over the frame, and specify the entry-point position without decoding the MPEG data stream. While having one entry-point per cell is a design goal, there is a wide range of data per slice dependent upon the priority channel and frame type. For further information on entry point processes, see U.S. Pat. No. 5,168,356.

Two methods of carrying redundant MPEG data in the Transport Block may be utilized. One method uses a specific Auxiliary Packet to carry a copy of the MPEG sequence Header (which could span multiple packets). The second method uses a modification of the Basic Service Transport Block to carry a copy of MPEG Group of Pictures (GOP) Header and Picture Header.

All information contained in the video service layer is supplied by the video encoder (and the priority processor in a two tier system). See U.S. Pat. No. 5,168,356 for a detailed description of a two tier system.

Specific formatting rules are required when encoding the Video Transport Block and are outlines below:

For HD Types 1, 2, 3 the HD ID bit 1 is toggled on the first sequence header of a GOP, the start of a B-Frame, and the start of a P-Frame.

A new cell is started at the beginning of a GOP (assuming GOP begins with an I-Frame), and the beginning of respective successive frames.

A "Basic Service" transport block format is used on the first cell of a GOP, and the first cell of respective successive frames.

A "Redundant Data" transport block format is used instead of the "Basic Service" format on the second packet of a frame if the frame spans multiple packets. The "Redundant Data" format is used again at an interval of about 4 to 8 times per frame.

The redundant transmissions of the MPEG Sequence header are carried as "Auxiliary Packets" at an interval of 5 to 30 per second.

Figure 6:
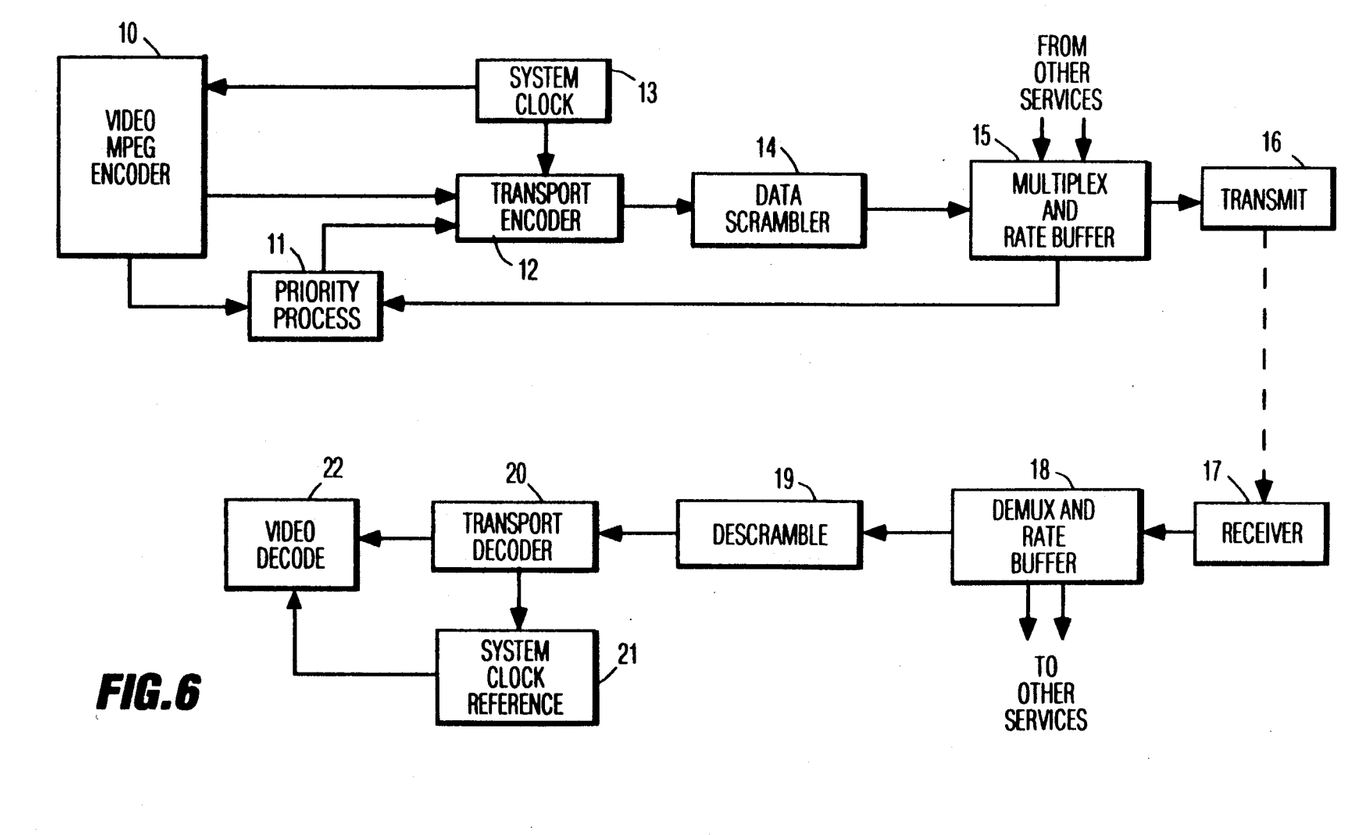
FIG. 6 is a system level block diagram identifying the transport encoder and decoder in the total system.

FIG. 6 is a block diagram of MPEG encoding apparatus including a transport encoder according to the present invention. The transport encoder takes a MPEG data stream and attaches a protocol which:

Allows a transport decoder to detect missing or invalid data;
Offers redundant transmission of critical data; and
Indicates data reentry points to restart MPEG decoding.

Input to the transport encoder 12 is either directly from an MPEG encoder 10 (for a one tier transmission system) or from a MPEG priority processor 11 (for a two tier transmission system). In two tier systems, two separate data paths are used, one for high-priority (HP) and one for low-priority (LP) data. The priority processor monitors rate buffer fullness, and generates priority-breakpoints which indicate where in the data stream data is split between the HP and LP data paths for each slice of MPEG data. The breakpoint data, along with the MPEG encoded data is the input data to the transport encoder 12. MPEG codewords arrive at the input of the transport encoder tagged with data word length indicia and data type indicia (e.g., header data, motion vectors, discrete cosine transform coefficients etc.). A further input to the transport encoder is provided by a system clock 13. This clock is incorporated to genlock the receiver and transmitter so decoder rate buffers do not overflow or underflow.

Output from the transport encoder 12 is sent to a service multiplexer and rate buffer 15 via a data scrambling mechanism 14. The multiplexer 15 interleaves data from different service sources. The output from the multiplexer 15 is applied to the communications channel via a transmitter 16.

A transport decoder receives cells from the communication channel receiver 17 via the service demultiplexer and rate buffer 18. The demultiplexer responsive to the data in the service type field of the transport cell header, separates data of different service types, and applies the separated data types to the appropriate processing circuitry. Video output data from the demultiplexer 18 is coupled to a descrambler 19 which performs a descrambling function which is inverse to the scrambling function of element 14. Descrambled data is applied to a transport decoder 20, which separates header data from service data and applies the service data to a decoder 22.

Output from the transport decoder 20 provides both a system clock (21) for synchronizing the receiver to the transmitting service, and a data path to the MPEG decoder 22. Within the transport decoder, error checks are performed to determine whether a cell has been lost or includes errors. For example, the CC code is monitored to determine if respective transport cells occur in proper sequence. Only transport cells for which no errors are detected are delivered to the MPEG decoder. The transport decoder strips off the Entry-Point Data from the transport block, decodes this header, and presents data to the MPEG decoder in a suitable format. If there is a cell discontinuity, the video transport decoder is programmed to initiate a sequence of resynchronizing tasks, as discussed below.

Figure 7:
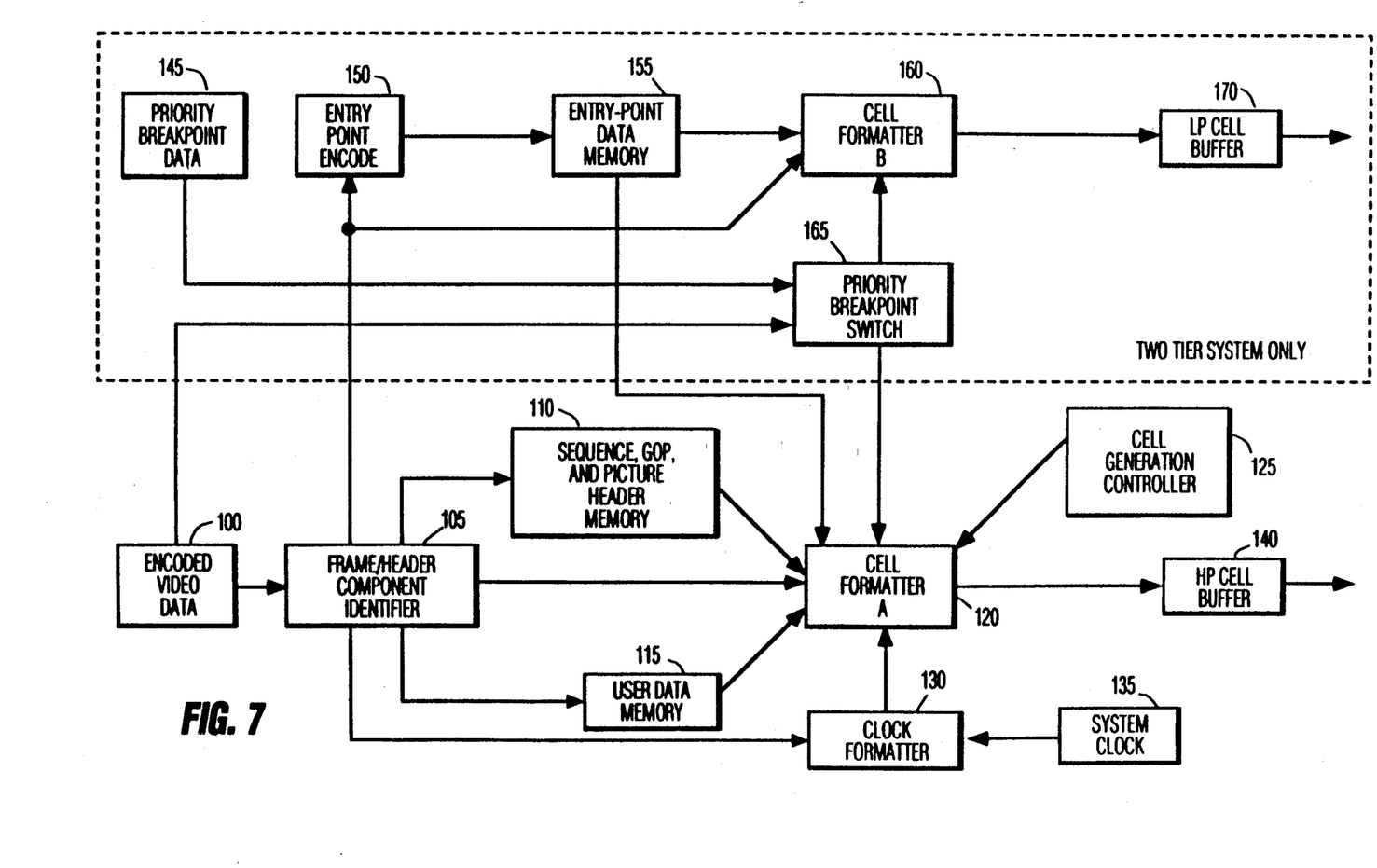
FIG. 7 is a block diagram of a typical transport encoder.

FIG. 7 is a block diagram of a typical transport encoder. For one-tier transmission systems, components 145-170 are not included. For two-tier systems, all components in FIG. 7 are used.

One-Tier Systems

Encoded video codewords, and corresponding codeword identifying indicia related to codeword type, and codeword length arrive at the transport encoder from the video encoder 100. Element 105, responsive to the identifying indicia captures and stores certain of the header information in a memory element 110. Data stored in element 110 will be included in the transmitted data a plurality of times to provide a degree of information redundancy. The data selected for redundant transmission generally includes sequence header data, GOP header data, and Picture header (PICT) data. At a minimum the data selected as redundant data is that data necessary to condition an MPEG decoder to begin decoding a data stream which has been entered at other than the beginning of a data sequence.

Nominally a sequence may include a large number of GOP's. Decoding of transmitted MPEG data requires use of the sequence header data. If the user tunes into the data after the occurrence of the sequence header, he may not be able to decode the subsequent data. The transport protocol described herein repeatedly provides sequence and other needed header data for decoding shortly after entering the transmitted data stream no matter where it is entered.

Element 105 also extracts user data and applies this data to a memory 115. User data may be of many different types such as time stamps; whether the images are in color or not; the form of chrominance preprocessing; whether the original source material was film mode or video mode etc.. The MPEG protocol does not support inclusion of these types of information. However inclusion of such information permits the receiver designer to incorporate special processing for particular signal types and thereby enhance the overall reproduction of images. The user data is included in auxiliary transport cells, when convenient.

Element 105 provides header identifying indicia to a clock formatter 130. Clock formatter 130 includes a clock which is sampled on the occurrence of certain header data to generate time stamps associated with the corresponding header data. These time stamps are used in receiver apparatus to provide a measure of signal synchronization.

Data from elements 105, 110, 115 and 130 are coupled to a cell formatter 120. Nominally formatter 120 receives data from element 105, parses such data into cell length packages, develops the appropriate video service transport headers according to the protocol indicated in FIGS. 1 and 2, concatenates the transport headers and the cell data, and couples the transport cells to a cell buffer 140. However, at the start of a sequence of data, and periodically during the transmission of data, the formatter is conditioned by the controller 125 to form and transmit other data. This other data includes auxiliary information such as time stamps from the clock formatter 130 for signal synchronization, and redundant header data stored in memory element 110.

Auxiliary data cells are generated as needed and included in the data stream when space is available. That is, auxiliary data cells may be interleaved with video data in any of the I, P or B field data. On the other hand redundant data is for the most part interleaved only with I field video data. This is because decoding of video data must start with an I field. All other fields of MPEG data are predictive and depend from I fields. The redundant data cells may be included at regularly spaced intervals or as data space is available but with at least a certain minimum inclusion of data to provide enough information to initiate decoding.

The cell formatter includes a continuity count in each transport cell regardless of type. The continuity count, CC, is incremented by one unit in successive cells and repeats modulo N, where N may be a convenient binary number such as 16.

Two-Tier Systems

Operation of the transport encoder in a two-tier system includes all functions described for a one-tier system, with the one-tier functions applied to the high priority or HP channel. In addition to the encoded video data provided at block 100, the priority processor (FIG. 6), provides priority breakpoint data which is stored in element 145. The breakpoint data is constant over a slice of MPEG data and indicates a threshold of what data (codewords) are placed on the HP channel and what data are placed on the LP channel. The priority breakpoint data is applied to a switch 165 which compares the breakpoint information stored in element 145 with the current codeword identity provided by element 100, and supplies data codewords to either cell formatter 120 or cell formatter 160 for generation of either HP or LP transport cells respectively.

The element 105 provides header data to a functional element 150 which develops entry-point definitions for both HP and LP data. These entry point definitions are stored in entry-point data memory 155. Cell formatters 120 and 160 create entry-point data for each cell generated. The entry-point is used by the decoder to resume decoding of the variable length data after a packet loss due to transmission errors. Completely formatted packets are sent from the LP cell formatter 160 to a cell buffer 170 for output.

Figure 8:
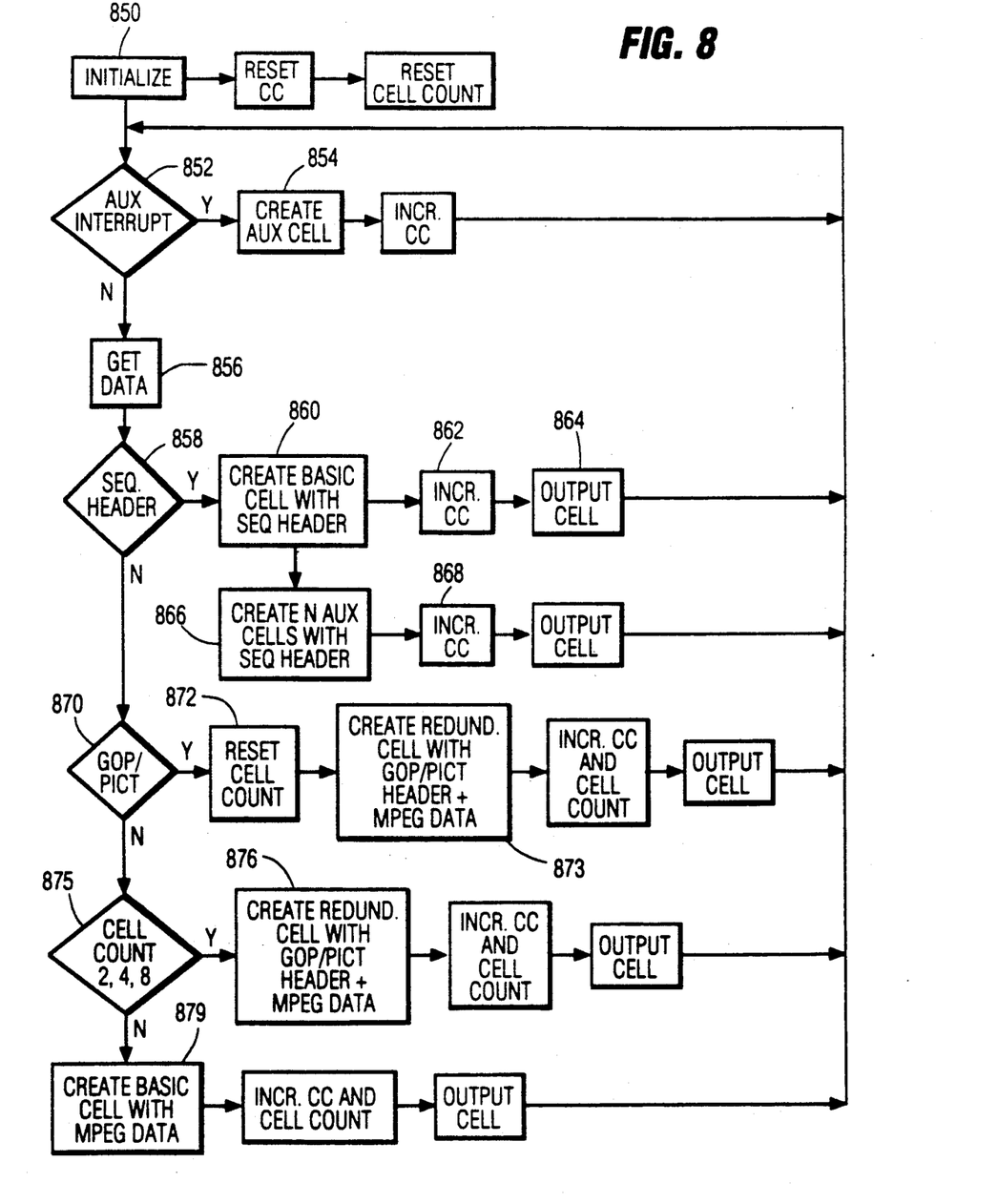
FIG. 8 is a flowchart representing operation of the transport encoder.

Referring to the flowchart of FIG. 8, the controller 125 initializes the system (850) by resetting the continuity counters (CC) and a cell count. It then checks (852) for an auxiliary data interrupt. These interrupts allow the user to interpose special information (if desired) for transmission. If an auxiliary interrupt has occurred, an auxiliary cell is created (854) and coupled to the rate buffer, and the auxiliary CC is incremented. If there is currently no channel space available, the system is directed to access MPEG data (856).

The MPEG data is checked for the occurrence of a sequence header (858). If a sequence header is available, a basic cell type is created (860) using the sequence header data. The basic cell continuity counter is incremented (862) and the cell is output (864) to the rate buffer. Following creation of the basic cell type with the sequence header data, N auxiliary type cells are created using the sequence header data. Here N is a small integer such as four. Each of the N auxiliary type cells are output, and the auxiliary continuity count is incremented with the production of each cell.

Alternatively, if sequence header data is not available, a test is performed to determine the occurrence of group of picture (GOP) or picture (PICT) header data (870). If GOP/PICT header data is available the cell count is reset (872) and a redundant type cell is created with the GOP/PICT header data (873). If space is available within the cell further MPEG data is included. The cell is output and the redundant cell continuity count and the cell count are incremented. Note at tests 858 and 870 if sequence headers or GOP or PICT headers are available, they are stored in memory element 110 for use in forming redundant cells of the same data.

If at test 870 the current MPEG data is not GOP/PICT header data, the cell count is tested. If the cell count is not, for example, 2, 4 or 8 then a basic type cell is created with the current MPEG data. Alternatively, if the cell count is 2, 4 or 8 then a redundant type cell is created with the last occurring GOP/PICT header data.

Table I shows an exemplary sequence of transport cells.

TABLE I

| RHD class | Packet Contents |
|---|---|
| Basic | Sequence Header or GOP Header with MPEG data |
| Aux | Redundant Sequence Header Transmission #1 |
| Aux | Redundant Sequence Header Transmission #2 |
| Aux | Redundant Sequence Header Transmission #N |
| Redundant | Redundant GOP/PICT Header + MPEG Data |
| Redundant | Redundant GOP/PICT Header + MPEG Data |
| Basic | MPEG Data |
| Redundant | Redundant GOP/PICT Header + MPEG Data |
| Basic | MPEG Data |
| Basic | MPEG Data |
| Basic | MPEG Data |
| Redundant | Redundant GOP/PICT Header + MPEG Data |
| Basic | MPEG Data |
| Basic | (... number of MPEG data packets ...) |
| . | . |
| . | . |
| . | . |
| Basic | Picture Header within MPEG Data |
| Redundant | Redundant GOP/PICT Header + MPEG Data |
| Redundant | Redundant GOP/PICT Header + MPEG Data |
| Basic | MPEG Data |
| Redundant | Redundant GOP/PICT Header + MPEG Data |
| Basic | MPEG Data |
| Basic | MPEG Data |
| Basic | MPEG Data |
| Redundant | Redundant GOP/PICT Header + MPEG Data |
| Basic | MPEG Data |
| Basic | (... a number of MPEG data packets ...) |
| Basic | MPEG Data |

Information (except video data) necessary to generate the sequence of transport cells shown in Table I is programmed into the cell formatter 120 and the controller 125. Responsive to respective start codes, the formatter and controller are conditioned to produce frame specific sequences of transport cells, and responsive to the type of transport cell to be generated appropriate transport header information is accessed from, e.g., internal memory or continuity counters. Also responsive to the programmed sequence, the controller and cell formatter are conditioned to process newly occurring compressed video data or stored header data. Note, once the transport cell sequence is established, forming the requisite transport cells involves simply time division multiplexing the relevant data.

Figure 9:
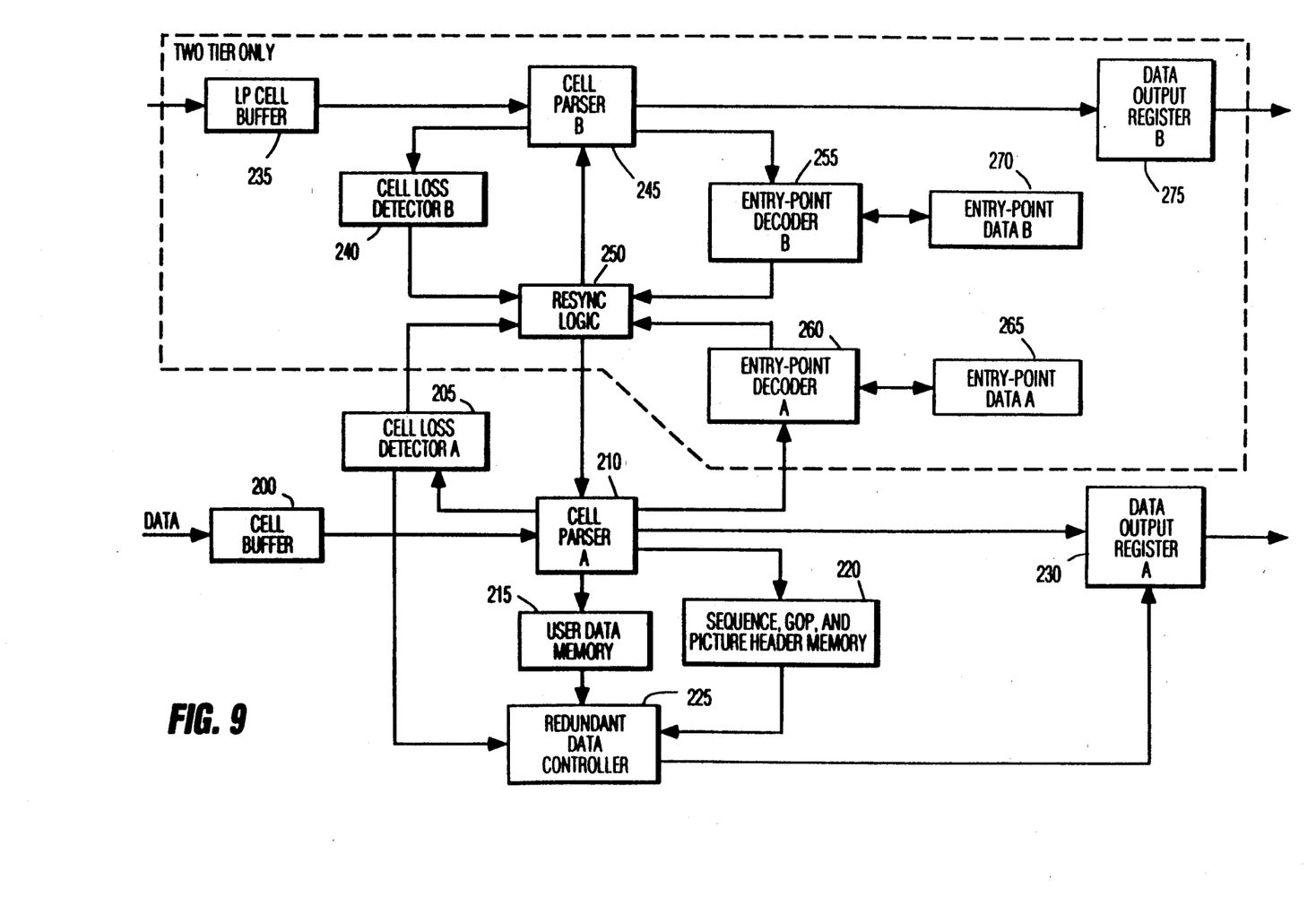
FIG. 9 is a block diagram of a typical transport decoder.

FIG. 9 is a block diagram of a typical transport decoder. For one-tier transmission systems, components 235-275 are not included. For two-tier systems, all components in FIG. 9 are used. In both one and two-tier systems, a cell Continuity Counter (CC) provides a minimal indication of whether a cell has been lost or corrupted during transmission. Additional loss indications may be provided by error detecting CRC or FEC encoding/decoding surrounding respective transport cells. Only errorless transport cells are delivered to the video decoder. The video transport decoder removes entry-point data and transport header data from respective transport cells, decodes the entry and transport header data, and responsive thereto provides data to the MPEG decoder in a suitable format. If there is a cell discontinuity, the video transport decoder is conditioned to initiate a sequence of resynchronizing tasks, as discussed below.

One-Tier Systems

Transport cells are provided to the transport decoder via a transport cell buffer 200. Programmed to respond to the encoded protocol, a cell parser 210 decodes the cell headers and separates respective service types of data. Auxiliary user data is directed to and stored in a memory 215. Redundant MPEG Sequence headers, GOP headers, and Picture headers are directed to and stored in a further memory 220. Normally occurring MPEG data (from basic service cells) is passed to an output register 230 from which it is supplied to the MPEG decoder. Based on an indication of cell loss in function 205, and the redundant data stored in memory 220, the redundant data controller 225 will supply error tokens followed by the appropriate redundant data from memories 215 and 220, to condition the MPEG decoder to continue decoding or resynchronize.

Two-Tier Systems

Operation of the transport decoder in a two-tier system includes all functions described for a one-tier system, with the one-tier functions applied to the HP channel. With a two-tier system, a second stream of low priority transport cells is available from the descrambler 19. These low priority transport cells are applied to a cell parser 245 via a cell buffer 235. MPEG data from the LP cell parser 245 is coupled to the MPEG decoder from the parser 245 via an output register 275. Both HP and LP cell parsers (210 and 245 respectively), extract entry point and transport header data from occurring transport cells. The HP and LP entry data are stored in memories 265 and 270 respectively If no cell loss is indicated by the continuity count the entry data is subsequently discarded. If cell loss is indicated the entry point data is utilized to re-enter the respective data streams at the next decodable piece of data. Re-entry is performed by elements 255 (LP), 260 (HP) and the resynchronization logic 250. The resynchronization logic, during a resync cycle, in effect conditions the respective cell parsers to skip/discard data to an entry point, and thereafter apply the next successive data to the registers 275 or 230 as appropriate. For example, a HP cell loss would require resync logic 250 to condition the cell parser 210 to skip over bits in the next good packet until positioned at the entry-point of that cell designated by the transport header. Then data at that HP entry-point is provided to output register 230. An LP cell loss would require the resync logic 250 to request cell parser 245 to jump to the next entry-point that is ahead of or equal to the HP entry-point. Data subsequent this entry point is then coupled to the register 275.

Figure 10A:
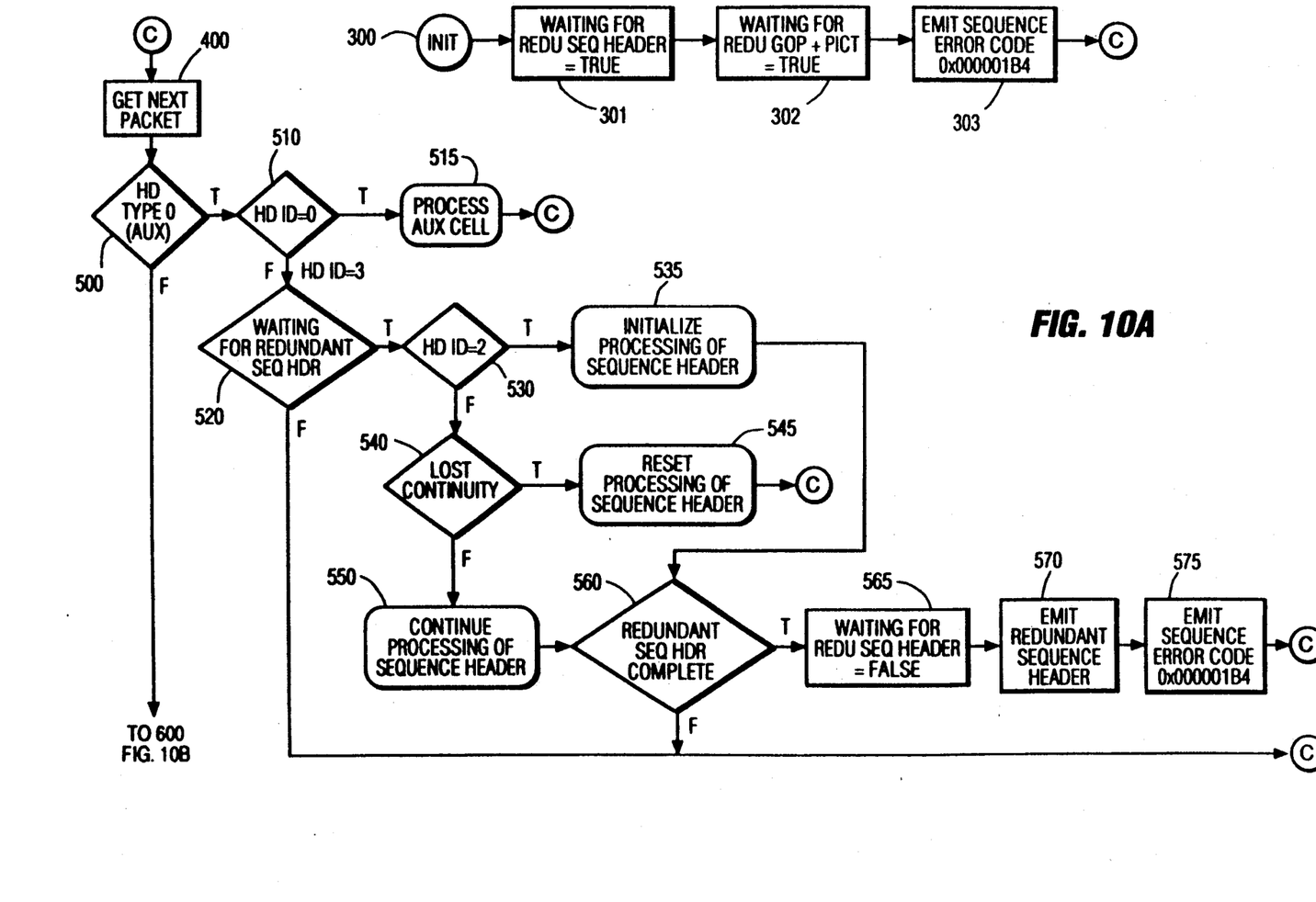
FIGS. 10A and 10B are a flowchart of operation of the transport decoder of a one-tier video system.
Figure 10B:
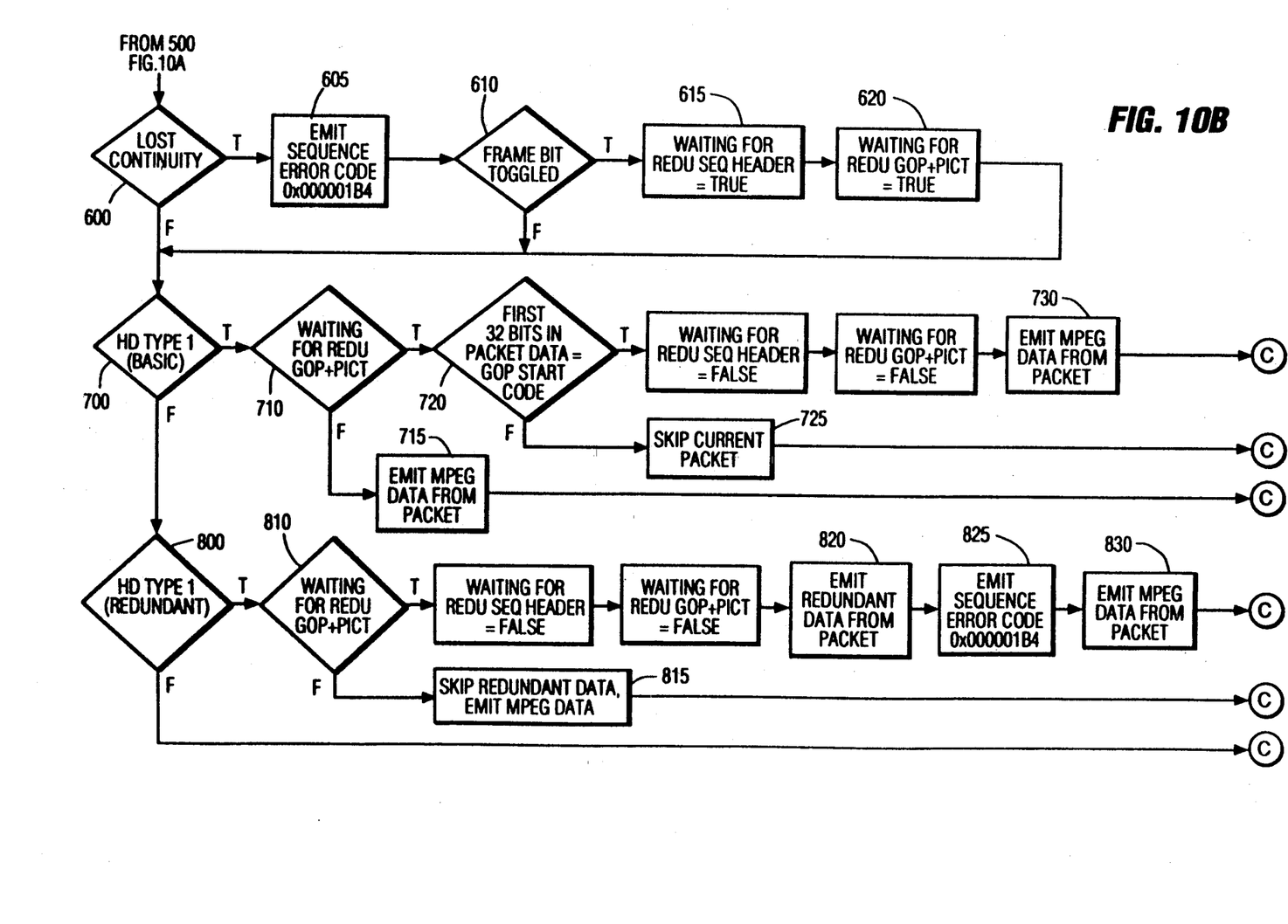

FIG. 10 shows a typical transport decoder algorithm for a one-tier video system. This algorithm includes an initialization sequence (300), and functions to process each packet (beginning at 400). This example assumes a particular retransmission policy for redundant Sequence Layer, and redundant GOP+PICT headers: Redundant GOP+PICT headers are transmitted in any frame; redundant Sequence Layer, and redundant GOP+PICT headers are transmitted only in I frames, and when redundant GOP+PICT headers are transmitted during an I frame, they have second priority to Redundant Sequence Headers.

The initialization sequence 300, sets (301, 302) two flags, which control waiting for redundant MPEG data in the transport protocol, to a "false state.". Initialization also produces (303) an error code to the MPEG decoder, so that the MPEG decoder is conditioned to wait for the next start-code when decoding resumes.

On completion of initialization, the system begins (400) processing respective transport cells. In this example, there are three possible processing paths dependent upon the state of the Header Designator (HD) in the respective cell. For HD type 0 (Aux cells), processing begins at decision stage (500), for HD type 1 (Basic cells), processing begins at decision stage (700), and for HD Type 2 (Redundant Cells), processing begins at decision stage (800). There is a check for lost cell continuity at decision stage (600) before processing of the MPEG data cells begins at points (700) and (800).

Auxiliary cell processing begins at decision stage (500). Here a test is done on the AUX Header Designator Identity. If the identity is 0 (test 510), then this cell contains an auxiliary data group, and the cell is processed at function (515). If at test (510), the Identity is not 0, then a test (520) is employed to determine if the decoder is waiting to recover redundant Sequence Header information. If not, the algorithm proceeds to the next packet at (400). If a Sequence Header is needed, and this cell marks the start of a Sequence Header (test 530), then the decoder initializes the processing of this header (535), checks to see if processing is completed at test (560), (for the case where all Sequence Header data was contained in one packet), and if so, sets the waiting-flag to false, outputs the header (570), and then provides another error token (575). This error token conditions the MPEG decoder to be prepared to start processing at a new entry-point. During the capture of a multiple cell AUX Sequence Header, a check on the cell continuity is performed (540). If there has been a loss, the Sequence Header processing is reset (545), else data is extracted from the AUX cell to continue processing of the Sequence Header (550). Thereafter the sequence header is again checked for completeness (560).

Before MPEG data packets are used, a check is made (600) for lost continuity. If there is a loss, an error code is provided (605) to the MPEG decoder and a check is made (610) for entering a new frame. If a new frame has been started during the loss, control flags are set true (615, 620) waiting for redundant MPEG headers.

If the packet is a Basic cell type (test 700), a check is made (710) to determine if the decoder is in a state waiting for redundant GOP+PICT headers (710). If it is not waiting for redundant headers, the MPEG data cell is forwarded (715) to the MPEG decoder. If the decoder is waiting for redundant headers, a check is performed (720) to determine if the current cell has the needed header embedded in the MPEG stream. The start of all frames is cell aligned, so if the first 32 bits of the cell is a MPEG start code, the needed headers will be available to the MPEG decoder within the MPEG stream. If the decoder is waiting for a redundant header, and it is not embedded, then the good packet is skipped (725). If the decoder is waiting for a redundant header, and it is embedded, the control flags waiting for redundant headers are set false, and the packet is forwarded (730) to the MPEG decoder.

If the cell is a Redundant cell type (test 800), and the transport decoder is not waiting for redundant information (810), the redundant data is skipped (815), and the remaining data in this cell is forwarded to the MPEG decoder. If the cell is a Redundant cell type (test 800), and the transport decoder is waiting for redundant information (test 810), the control flags waiting for redundant headers are set false, the redundant header information from this cell is forwarded (820) to the MPEG decoder, followed by an error token (825), so that the MPEG decoder will look for the next start-code when decoding resumes. And finally the MPEG data of this packet is extracted and forwarded (830) to the MPEG decoder.

What is claimed is:

1. In a digital video transmission system for transmitting a hierarchically layered compressed video signal wherein respective layers of compressed signal include headers containing data descriptive of said respective layers, apparatus for segmenting said hierarchically layered compressed video signal into transport cells, respective transport cells containing a first predetermined number, N, of data bits divided between a transport cell header including a second predetermined number, K, of data bits and an information packet of N-K data bits, said transport cell headers data bits containing information for identifying data bits of corresponding information packets, said apparatus comprising:
   a source of hierarchically layered compressed video signal (HLCVS);
   means responsive to header data of said HLCVS for generating, at least in part, said transport cell headers;
   means responsive to said HLCVS for dividing said HLCVS, including headers, into information packets of no greater than N-K data bits;
   means responsive to header data of said HLCVS for generating redundant information packets of no greater than N-K data bits including only predetermined types of header data of said HLCVS;
   means for concatenating transport cell headers and corresponding information packets to form transport cells; and
   means for interspersing transport cells including information packets of HLCVS data with transport cells including redundant information packets to form a sequence wherein a first number of redundant information packets included in first video frames is greater than a second number (including zero) of redundant information packets in second video frames.

2. In a digital video transmission system for transmitting a hierarchically layered compressed video signal wherein respective layers of compressed signal include headers containing data descriptive of said respective layers, apparatus for segmenting said hierarchically layered compressed video signal into transport cells, respective transport cells containing a first predetermined number, N, of data bits divided between a transport cell header including a second predetermined number, K, of data bits and an information packet of N-K data bits, said transport cell headers data bits containing information for identifying data bits of corresponding information packets, said apparatus comprising:
   a source of hierarchically layered compressed video signal (HLCVS);
   means responsive to header data of said HLCVS for generating, at least in part, said transport cell headers;
   means responsive to said HLCVS for dividing said HLCVS, including headers, into information packets of no greater than N-K data bits;
   means responsive to header data of said HLCVS for generating redundant information packets of no greater than N-K data bits including only predetermined types of header data of said HLCVS;
   means for concatenating transport cell headers and corresponding information packets to form transport cells and redundant transport cells; and
   means for interspersing transport cells with redundant transport cells, and for cyclically reducing the frequency of occurrence of redundant transport cells interspersed between transport cells.

3. In a digital video transmission system for transmitting a hierarchically layered compressed video signal wherein respective layers of compressed signal include headers containing data descriptive of said respective layers, apparatus for segmenting said hierarchically layered compressed video signal into transport cells, respective transport cells containing a first predetermined number, N, of data bits divided between a transport cell header including a second predetermined number, K, of data bits and an information packet of N-K data bits, said transport cell headers data bits containing information for identifying data bits of corresponding information packets, said apparatus comprising:
   a source of hierarchically layered compressed video signal (HLCVS) which conforms to MPEG standards;
   means responsive to header data of said HLCVS for generating, at least in part, said transport cell headers;
   means responsive to said HLCVS for dividing said HLCVS, including headers, into information packets of no greater than N-K data bits;
   means responsive to header data of said HLCVS for generating redundant information packets of no greater than N-K data bits including only redundant information packets of sequence header data, and redundant information packets of group of pictures (GOP) header and redundant information packets of picture (PICT) header data;
   means for concatenating transport cell headers and corresponding information packets to form transport cells and redundant transport cells; and
   means for interspersing transport cells with redundant transport cells.

4. The apparatus set forth in claim 3 wherein said means for interspersing repeats in succession, a predetermined number of transport cells including redundant information packets of sequence header data.

5. The apparatus set forth in claim 4 wherein said means for interspersing includes means for cyclically reducing the frequency of transport cells (including redundant information packets) interspersed between transport cells including information packets of HLCVS data.

6. The apparatus set forth in claim 3 wherein said HLCVS includes frames, I, of video data compressed according to intraframe compression techniques, and frames (P, B) of video data compressed according to interframe compression techniques, and said means for interspersing transport cells intersperses transport cells including redundant information packets of sequence header data and redundant information packets of GOP and PICT header data with transport cells having information packets of MPEG (I) frame data; and intersperses transport cells including redundant information packets of only GOP/PICT header data with transport cells having information packets of MPEG (B, P) frame data.

7. The apparatus set forth in claim 3 wherein said means for generating redundant information packets includes:
   memory means for storing header data occurring in said HLCVS; and
   said means for generating, generates redundant information packets from header data stored in said memory means, and appends thereto, if said header data occupies less than N-K data bits, currently occurring HLCVS data to a total of N-K data bits.

8. In a digital video transmission system for transmitting a hierarchically layered compressed video signal wherein respective layers of compressed signal include headers containing data descriptive of said respective layers, apparatus for segmenting said hierarchically layered compressed video signal into transport cells, respective transport cells containing a first predetermined number, N, of data bits divided between a transport cell header including a second predetermined number, K, of data bits and an information packet of N-K data bits, said transport cell headers data bits containing information for identifying data bits of corresponding information packets, said apparatus comprising:
   means for segmenting said compressed video signal into fixed length packets and forming respective packets into transport cells; and generating redundant packets with predetermined portions of only headers of said compressed video signal and forming respective redundant packets into further transport cells, and interspersing said further transport cells with said transport cells such that said further cells occur with declining frequency according to a predetermined pattern.

9. In a digital video transmission system for transmitting a hierarchically layered compressed video signal said compressed video signal being compressed on a field/frame basis according to at least two types of compression coding intraframe and interframe and wherein respective layers of compressed signal include headers containing data descriptive of said respective layers, apparatus for segmenting said hierarchically layered compressed video signal into transport cells, respective transport cells containing a first predetermined number, N, of data bits divided between a transport cell header including a second predetermined number, K, of data bits and an information packet of N-K data bits, said transport cell headers data bits containing information for identifying data bits of corresponding information packets, said apparatus comprising:
   means for segmenting said compressed video signal into fixed length packets and forming respective packets into transport cells; and generating redundant packets with predetermined portions of headers of said compressed video signal and forming respective redundant packets into further transport cells, and interspersing said further transport cells with said transport cells with declining frequency and such that said further transport cells are interspersed with said transport cells of intraframe compressed video signal differently than said further transport cells are interspersed with said transport cells of interframe compressed video signal.

10. In a digital video transmission system for transmitting in transport cells, hierarchically layered compressed video signal including video header data related to video frames, said transport cells being interspersed with further transport cells including redundant data corresponding to predetermined portions of said video header data, said transport and further transport cells including transport cell headers and information packets, receiver apparatus comprising:
   means for receiving transmitted said transport cells and said further transport cells, and separating said transport cell headers and information packets;
   means responsive to transport cell header data for determining the occurrence of transport cells which include said video header data being lost or corrupted during transmission, and responsive to determining such occurrence, discarding subsequently occurring non-corrupted transport cells until the occurrence of one of said further transport cells, and
   decompression means responsive to said information packets for generating decompressed video signal.

11. The receiver set forth in claim 10 further including means for substituting data from said further transport cells for data in said transport cells on the occurrence of lost or corrupted transport cells.

12. The receiver set forth in claim 10 further including means for discarding said redundant data in said further transport cells if no determination is made that transport cells preceding said further transport cells have been lost or corrupted.

13. The receiver set forth in claim 10 wherein said transport cell headers include indicia indicating whether corresponding transmitted transport cells include compressed video signal or said redundant data, and said receiver includes means responsive to said indicia for determining whether respective transport cells include compressed video signal or redundant data.

14. In a digital video transmission system for transmitting a hierarchically layered compressed video signal, said compressed video signal including frames of compressed video data compressed by intraframe processing and frames of compressed video data compressed by interframe processing, and wherein respective layers of compressed signal include video headers descriptive of said respective layers, apparatus for segmenting said compressed video signal into transport cells, respective transport cells containing a transport cell header and a payload packet containing a portion of said compressed video signal, said apparatus comprising:
   a source of hierarchically layered compressed video signal (HLCVS);
   means responsive to said HLCVS for dividing said HLCVS, into payload packets;
   means responsive to said HLCVS for generating redundant payload packets including predetermined types of said hierarchically layered compressed video signal;
   means, responsive to header data of said HLCVS, for generating, at least in part, said transport cell headers, respective cell headers including a data field which indicates whether a transport payload is compressed video signal or a redundant payload packet;
   means for concatenating transport cell headers and corresponding payload or redundant payload packets to form transport cells; and
   means for interspersing transport cells including payload packets with transport cells including redundant payload packets, said means interspersing a greater number of transport cells containing redundant payload packets with frames of compressed video data compressed by intraframe processing than frames of compressed video data compressed by interframe processing.

15. In a digital video transmission system for transmitting a hierarchically layered compressed video signal, said compressed video signal occuring in groups of frames, and wherein respective layers of compressed signal include video headers descriptive of said respective layers, apparatus for segmenting said compressed video signal into transport cells, respective transport cells containing a transport cell header and a payload packet containing a portion of said compressed video signal, said apparatus comprising:

a source of hierarchically layered compressed video signal (HLCVS);

means responsive to said HLCVS for dividing said HLCVS, into payload packets;

means responsive to said HLCVS for generating redundant payload packets including predetermined types of said hierarchically layered compressed video signal;

means, responsive to header data of said HLCVS, for generating, at least in part, said transport cell headers, respective cell headers including a data field which indicates whether a transport payload is compressed video signal or a redundant payload packet;

means for concatenating transport cell headers and corresponding payload or redundant payload packets to form transport cells; and     means for interspersing transport cells including payload packets with transport cells including redundant payload packets, said means interspersing a greater number of transport cells containing redundant payload packets with transport cells containing payload packets near the beginning of a group of frames than near the end of a group of frames.

* * * * *